Patented Feb. 6, 1945

2,369,009

UNITED STATES PATENT OFFICE 2,369,009

CONVERSION OF HYDROCARBONS

Herman S. Bloch and Charles L. Thomas, Chicago, Ill., assignors to Universal Oil Products Company, Chicago, Ill., a corporation of Delaware No Drawing. Application February 23, 1942, Serial No. 432,031

9 Claims. (Cl. 196—50)

This invention relates to a process for producing valuable motor fuels of high antiknock value from hydrocarbon oils. More specifically, it is concerned with the conversion of olefin containing distillates boiling within the motor fuel range into a gasoline having a relatively low olefin content which is suitable as an aviation fuel blending stock.

It has been found by previous investigators that certain metallic oxides such as the oxides of chromium, tungsten, molybdenum, etc. may be used as catalysts for the destructive hydrogenation of higher boiling hydrocarbon oils to form lower boiling saturated hydrocarbons. Usually, however, such processes result in a product of relatively low octane number which, although relatively olefin free, is not suitable as aviation fuel blending stock for this reason. According to the present invention, however, a high octane number aviation fuel blending stock may be prepared from an olefinic gasoline or higher boiling hydrocarbon oil produced by a thermal cracking, thermal reforming, catalytic cracking, or polymerization, etc. processes.

In one specific embodiment, the present invention comprises subjecting an olefin-containing hydrocarbon oil boiling in the approximate range of gasoline together with a higher boiling hydrocarbon oil to contact with a composite catalyst comprising a hydrogenating component and a cracking component at a temperature within the range of approximately 500 to 900° F. and under a hydrogen pressure of approximately 10 to 200 atmospheres to produce a gasoline having a relatively low olefin content and having a high antiknock value.

The hydrogenating-cracking catalyst composite may be prepared by several different procedures which, although the final composite is satisfactory in each case, do not necessarily result in strictly equivalent catalysts. According to one method of preparation, the hydrogenating component and the cracking component of the catalyst mass may be separately precipitated and intimately mixed prior to use. According to another method, the cracking component may be prepared by any suitable method and thereafter impregnated with the hydrogenating component to form a uniform composite mass. In any case, the catalyst may be shaped into particles or it may be employed in the powdered form depending upon the type of operation in which it is to be employed.

The hydrogenating component of the present catalyst comprises an oxide or sulfide of molybdenum, chromium, tungsten, uranium, vanadium, tin (stannous), iron, nickel, cobalt, manganese, and copper, as well as metallic nickel, copper, and nickel-copper. These compounds may be deposited on carriers having relatively little catalytic effect in themselves such as alumina, magnesia, fuller's earth, montmorillonite, silica, kieselguhr, etc., by impregnation with a solution of a compound of the hydrogenating component which can be converted to the oxide or sulfide by heating. As a typical example, a chromium oxide on alumina hydrogenating component may be prepared by impregnating the alumina with a suitable chromium compound such as chromic acid, followed by heating the impregnated mass at an elevated temperature of 900° F. or higher in order to form a suitable activated catalyst. Other methods of preparation of the hydrogenating component such as precipitation of the hydroxide on the carrier may also be used. The amount of hydrogenating component in the composite is generally within the range of from 0.5 to 50% by weight and is preferably less than about 20% by weight.

The cracking component of the present catalytic composite may comprise any suitable cracking catalyst consisting essentially of difficultly reducible oxides which do not undergo a valence change in alternate processing and regenerating treatments. A suitable catalyst may consist, for example, of a major proportion of precipitated silica composited with one or more hydrated oxides selected from the group consisting of hydrated alumina, hydrated zirconia, and hydrated thoria. These catalysts may be either synthetically prepared or they may be various naturally occurring substances of the clay type.

In the preparation of the preferred cracking catalyst component, precipitated hydrated alumina or one of the other hydrated oxides previously mentioned is composited with hydrated silica gel, followed by washing, drying, and calcining of the mass. In the preparation of one of the preferred cracking catalyst components, a precipitated hydrated silica substantially alkali free is suspended in an aqueous solution of aluminum chloride and zirconium chloride following which precipitated hydrated alumina and precipitated hydrated zirconia are deposited on the silica gel by the addition of an alkaline precipitant. The resulting mass of composite hydrated oxides is water washed, dried, and calcined at about 1400° F. Although this is the preferred preparation of the cracking catalyst component, many other procedures which will give rise to a cracking catalyst having as its essential ingredients precipitated silica together with one or more of the compounds in the group consisting of precipitated alumina, precipitated zirconia, and precipitated thoria may be employed.

The manner in which the hydrogenating component and the cracking component are composited is dependent to a large extent upon the type of process which is to be employed. For example, according to one method of operation, the hydrocarbon oil is passed through a bed of the catalyst at reaction temperature and the products of reaction are continuously withdrawn from the exit end of the bed. In such a fixed bed operation, the hydrogenating component and the cracking component, each in granular form, may be deposited in alternate layers in the catalyst bed, or the granular composites may be intermingled, or the hydrogenating component may be deposited upon the cracking component to form a uniform composite catalyst effective in both reactions. On the other hand, if processes employing powdered catalysts are to be used, the hydrogenating component and the cracking component may be intimately mixed in the powdered form, or the hydrogenating component may be deposited upon the cracking component, the latter being used as a support. Several methods may be employed when using the powdered catalysts; for example, the hydrocarbon charge may be passed upward through a turbulent bed of the powdered catalyst or the powdered catalyst may be suspended in a flowing stream of the hydrocarbon charge and subjected to reaction temperatures.

As previously noted, the charging stock for this process usually comprises a mixture of an olefin containing fraction boiling in the gasoline range composited with a higher boiling hydrocarbon oil such as naphtha, kerosene, gas oil, etc., the higher boiling oil preferably being naphthenic or hydroaromatic in character. The olefin containing fraction referred to may comprise cracked gasolines produced by the catalytic or non-catalytic decomposition of naphthas or higher boiling oils into gasoline. In other cases, however, polymer gasolines produced either by thermal or catalytic polymerization of low boiling olefins may be employed as the olefinic fraction.

The optimum conditions for operating the present process may vary depending to a large extent upon the type and boiling range of the oil being processed, upon the type of catalyst that is employed, and upon the proportion of hydrogen that is used. Usually, however, operating temperatures will be within the range of from approximately 500 to 900° F. and are preferably within the range of from about 650 to 850° F. Operating pressures may range from 10 to 200 atmospheres, but usually pressures of approximately 100 atmospheres or less are preferred for continuous operation.

It is usually necessary, at periodic intervals, to regenerate the catalyst to remove combustible deposits which accumulate on the catalytic surfaces and render them less active. The regeneration is ordinarily effected by contacting the catalyst with an oxygen containing gas to remove the deposits by combustion. Usually, the temperature of the regeneration reaction is not allowed to exceed about 1200° F. in order that damage to the activity of the catalyst may be reduced to a minimum.

The following example illustrates the yields that may be expected when operating according to the process of this invention.

*Example*

A thermal gasoline having a bromine number of about 95, obtained from a thermal cracking operation, was combined with approximately 40% by volume of a gas oil obtained from a Coastal source. Then resulting composite was contacted in an atmosphere of hydrogen with a hydrogenating-cracking catalyst comprising a silica alumina mass having deposited thereon approximately 10% by weight of molybdenum oxide. The average temperature during contacting was approximately 800° F., the average pressure about 25 atmospheres, and the average space velocity about 1. The reaction products were fractionated to separate an aviation fuel blending stock having a 300° F. end-point from the remaining conversion products. On a single pass, approximately 60% by volume of a 300° F. end-point distillate was obtained based on the total charge. This distillate had a clear octane number of approximately 74 and a leaded octane number of 95 on the addition of 6 cc. of tetra-ethyl lead per gallon. The gasoline was sweet to the doctor test, had a bromine number of approximately 4, and was suitable in all respects as an aviation fuel blending stock.

We claim as our invention:

1. A process for producing a gasoline having a relatively low bromine number from an olefinic gasoline which comprises subjecting said olefinic gasoline admixed with naphthenic hydrocarbons heavier than gasoline to an olefin saturating treatment in the presence of a hydrogenating catalyst and a siliceous cracking catalyst at a temperature in the approximate range of from 500° to 900° F. and under hydrogen pressure of from about 10 to 200 atmospheres, whereby to product a gasoline relatively low in olefins.

2. A process for producing relatively low bromine number motor fuel which comprises subjecting olefinic gasoline, admixed with naphthenic hydrocarbons heavier than gasoline, to an olefin saturating treatment in the presence of a hydrogenating catalyst and a cracking catalyst comprising precipitated silica and precipitated alumina at a temperature in the approximate range of 500° to 900° F. and under hydrogen pressure of about 10 to 200 atmospheres, whereby to produce a substantially olefin-free gasoline.

3. A process for producing relatively low bromine number motor fuel which comprises subjecting olefinic gasoline, admixed with naphthenic hydrocarbons heavier than gasoline, to an olefin saturating treatment in the presence of a hydrogenating catalyst and a cracking catalyst comprising precipitated silica and precipitated zirconia at a temperature in the approximate range of 500° to 900° F. and under hydrogen pressure of about 10 to 200 atmospheres, whereby to produce a substantially olefin-free gasoline.

4. A process for producing relatively low bromine number motor fuel which comprises subjecting olefinic gasoline, admixed with naphthenic hydrocarbons heavier than gasoline, to an olefin saturating treatment in the presence of a hydrogenating catalyst and a cracking catalyst comprising calcined hydrogels of silica, alumina, and zirconia, at a temperature in the approximate range of 500° to 900° F. and under hydrogen pressure of about 10 to 200 atmospheres, whereby to produce a substantially olefin-free gasoline.

5. The process as defined in claim 2 further characterized in that a gas oil containing naphthenes is admixed with said olefinic gasoline as the source of said hydrocarbons heavier than gasoline.

6. The process as defined in claim 2 further characterized in that a straight-run petroleum oil containing naphthenes is admixed with the olefinic gasoline as the source of said hydrocarbons heavier than gasoline.

7. A process for producing relatively low bromine number motor fuel which comprises subjecting olefinic gasoline, admixed with naphthenic hydrocarbons heavier than gasoline, to an olefin saturating treatment in the presence of a hydrogenating catalyst and a cracking catalyst comprising silica and alumina at a temperature in the approximate range of 500° to 900° F. and under hydrogen pressure of about 10 to 200 atmospheres, whereby to produce a substantially olefin-free gasoline.

8. A process for producing a gasoline having a relatively low bromine number from an olefinic gasoline which comprises subjecting said olefinic gasoline admixed with hydro-aromatic hydrocarbons heavier than gasoline to an olefin saturating treatment in the presence of a hydrogenating catalyst and a siliceous cracking catalyst at a temperature in the approximate range of from 500° to 900° F. and under hydrogen pressure of from about 10 to 200 atmospheres, whereby to produce a gasoline relatively low in olefins.

9. A process for producing relatively low bromine number motor fuel which comprises subjecting olefinic gasoline, admixed with hydro-aromatic hydrocarbons heavier than gasoline, to an olefin saturating treatment in the presence of a hydrogenating catalyst and a cracking catalyst comprising silica and alumina at a temperature in the approximate range of 500° to 900° F. and under hydrogen pressure of about 10 to 200 atmospheres, whereby to produce a substantially olefin-free gasoline.

HERMAN S. BLOCH.
CHARLES L. THOMAS.